United States Patent
Aono

(10) Patent No.: US 9,815,491 B2
(45) Date of Patent: Nov. 14, 2017

(54) ELECTRIC POWER STEERING APPARATUS

(71) Applicant: JTEKT CORPORATION, Osaka-shi, Osaka (JP)

(72) Inventor: Shinya Aono, Okazaki (JP)

(73) Assignee: JTEKT CORPORATION, Osaka (JP)

(*) Notice: Subject to any disclaimer, the term of this patent is extended or adjusted under 35 U.S.C. 154(b) by 39 days.

(21) Appl. No.: 14/618,315

(22) Filed: Feb. 10, 2015

(65) Prior Publication Data

US 2015/0232120 A1 Aug. 20, 2015

(30) Foreign Application Priority Data

Feb. 18, 2014 (JP) ................................. 2014-028801

(51) Int. Cl.
| | | |
|---|---|---|
| *B62D 5/04* | (2006.01) | |
| *B62D 6/00* | (2006.01) | |
| *B62D 6/10* | (2006.01) | |

(52) U.S. Cl.
CPC ......... *B62D 5/0463* (2013.01); *B62D 5/0466* (2013.01); *B62D 6/002* (2013.01); *B62D 6/10* (2013.01)

(58) Field of Classification Search
CPC . B62D 5/0463; B62D 5/0466; B62D 15/0245
See application file for complete search history.

(56) References Cited

U.S. PATENT DOCUMENTS

| | | | | |
|---|---|---|---|---|
| 2003/0164261 A1* | 9/2003 | Takahashi | .......... | B62D 15/0245 180/443 |
| 2009/0125187 A1* | 5/2009 | Yamamoto | ........... | B62D 5/0457 701/42 |
| 2014/0297123 A1* | 10/2014 | Nozawa | ............... | B62D 5/0463 701/41 |
| 2015/0375777 A1* | 12/2015 | Endo | .................... | B62D 5/0466 701/41 |
| 2016/0001811 A1* | 1/2016 | Endo | .................... | B62D 5/0466 701/41 |

FOREIGN PATENT DOCUMENTS

| | | |
|---|---|---|
| EP | 1332943 A1 | 8/2003 |
| EP | 1944221 A1 | 7/2008 |
| JP | 2003291842 A | 10/2003 |
| JP | 2004082856 A | 3/2004 |

OTHER PUBLICATIONS

Mar. 14, 2016 Extended Search Report issued in European Patent Application No. 15154312.1.

* cited by examiner

*Primary Examiner* — Thomas Ingram
(74) *Attorney, Agent, or Firm* — Oliff PLC

(57) ABSTRACT

An electric power steering apparatus is provided which can suppress the difference in steering feel between before and after it is allowed to compute an absolute steering angle and which can improve the steering feel. A basic assist control unit sets a basic assist current value. An assist gain setting unit sets assist gain. The assist gain is fixed to a lower limit value less than one before it is allowed to compute the absolute steering angle, and is gradually increased from the lower limit value to one and is then fixed to one after it is allowed to compute the absolute steering angle. An assist gain multiplication unit corrects the basic assist current value by multiplying the basic assist current value by the assist gain.

13 Claims, 10 Drawing Sheets

ELECTRIC POWER STEERING APPARATUS

INCORPORATION BY REFERENCE

The disclosure of Japanese Patent Application No. 2014-028801 filed on Feb. 18, 2014 including the specification, drawings and abstract, is incorporated herein by reference in its entirety.

BACKGROUND OF THE INVENTION

1. Field of the Invention

The invention relates to electric power steering apparatuses.

2. Description of the Related Art

Conventionally, electric power steering apparatuses are known which perform steering wheel return control of applying torque in a returning direction of a steering wheel in addition to assist control of applying torque in a steering direction (see Japanese Patent Application Publication Nos. 2003-291842 (JP 2003-291842 A) and 2004-82856 (JP 2004-82856 A)). The steering wheel return control is performed in order to improve steering performance at the time of returning the steering wheel to a neutral position. In the electric power steering apparatus described in JP 2003-291842 A, a vehicle is estimated to be in a straight traveling state based on the vehicle speed, steering torque, steering angular velocity, and yaw rate, and a relative steering angle (relative rudder angle) at the time the vehicle is estimated to be in the straight traveling state is estimated as a neutral angle. An absolute steering angle (absolute rudder angle) is computed based on the neutral angle and the relative steering angle, and steering wheel return torque is computed based on the absolute steering angle by a steering wheel return control unit. Command torque is computed by adding the steering wheel return torque, inertia torque, and damper torque to assist torque computed by an assist control unit, and a motor is driven and controlled based on a command current value according to the command torque.

In electric power steering apparatuses in which steering wheel return torque or its corresponding compensating current value is computed based on an absolute steering angle as in the electric power steering apparatus described in JP 2003-291842 A, the steering wheel return torque and its corresponding compensating current value are not computed until it is allowed to compute the absolute steering angle, namely until a vehicle is estimated to be in a straight traveling state. Accordingly, the steering wheel return torque and its corresponding compensating current value are not reflected in command torque and a command current value before it is allowed to compute the absolute steering angle. After it is allowed to compute the absolute steering angle, the steering wheel return torque and its corresponding compensating current value are reflected in the command torque and the command current value.

Therefore, there is a difference in steering feel between before and after it is allowed to compute the absolute steering angle. Specifically, returning movement to a neutral position of the steering is worse before it is allowed to compute the absolute steering angle than after it is allowed to compute the absolute steering angle. The driver therefore may have an uncomfortable steering feel before and after it is allowed to compute the absolute steering angle.

SUMMARY OF THE INVENTION

It is one object of the invention to provide an electric power steering apparatus capable of eliminating degradation in steering feel which is caused by a compensating current value not being reflected before it is allowed to compute an absolute steering angle and thus capable of suppressing the difference in steering feel between before and after it is allowed to compute the absolute steering angle, and capable of improving steering feel.

An electric power steering apparatus according to one aspect of the invention includes:

an electric motor that generates a steering assist force;

a motor control device that drives and controls the electric motor based on a target current value;

a steering torque detector that detects steering torque;

a basic assist current value setting device that sets a basic assist current value by using the steering torque that is detected by the steering torque detector;

a relative steering angle detector that detects a relative steering angle;

a neutral position determining device that determines a steering neutral position by detecting a straight traveling state of a vehicle;

an absolute steering angle computation device that computes an absolute steering angle serving as an absolute steering angle with respect to the steering neutral position determined by the neutral position determining device, based on the relative steering angle that is detected by the relative steering angle detector;

a compensating current value computation device that computes a compensating current value for steering wheel return control of applying torque in such a direction that a steering wheel returns to a neutral position when a driver returns the steering wheel to the neutral position, by using the absolute steering angle that is computed by the absolute steering angle computation device;

a basic assist current value correction device that changes the basic assist current value that is set by the basic assist current value setting device, according to whether it is before or after the absolute steering angle computation device is allowed to compute the absolute steering angle; and a target current value computation device that computes the target current value by using the basic assist current value corrected by the basic assist current value correction device and the compensating current value computed by the compensating current value computation device.

According to the aspect, the basic assist current value can be changed and corrected according to whether it is before or after it is allowed to compute the absolute steering angle. Accordingly, for example, before it is allowed to compute the absolute steering angle, namely when the compensating current value is not reflected, the basic assist current value can be corrected so as to complement the compensating current value. This can eliminate degradation in steering feel which is caused by the compensating current value not being reflected before it is allowed to compute the absolute steering angle, and can suppress the difference in steering feel between before and after it is allowed to compute the absolute steering angle. As a result, an uncomfortable steering feel can be suppressed, and the steering feel can be improved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
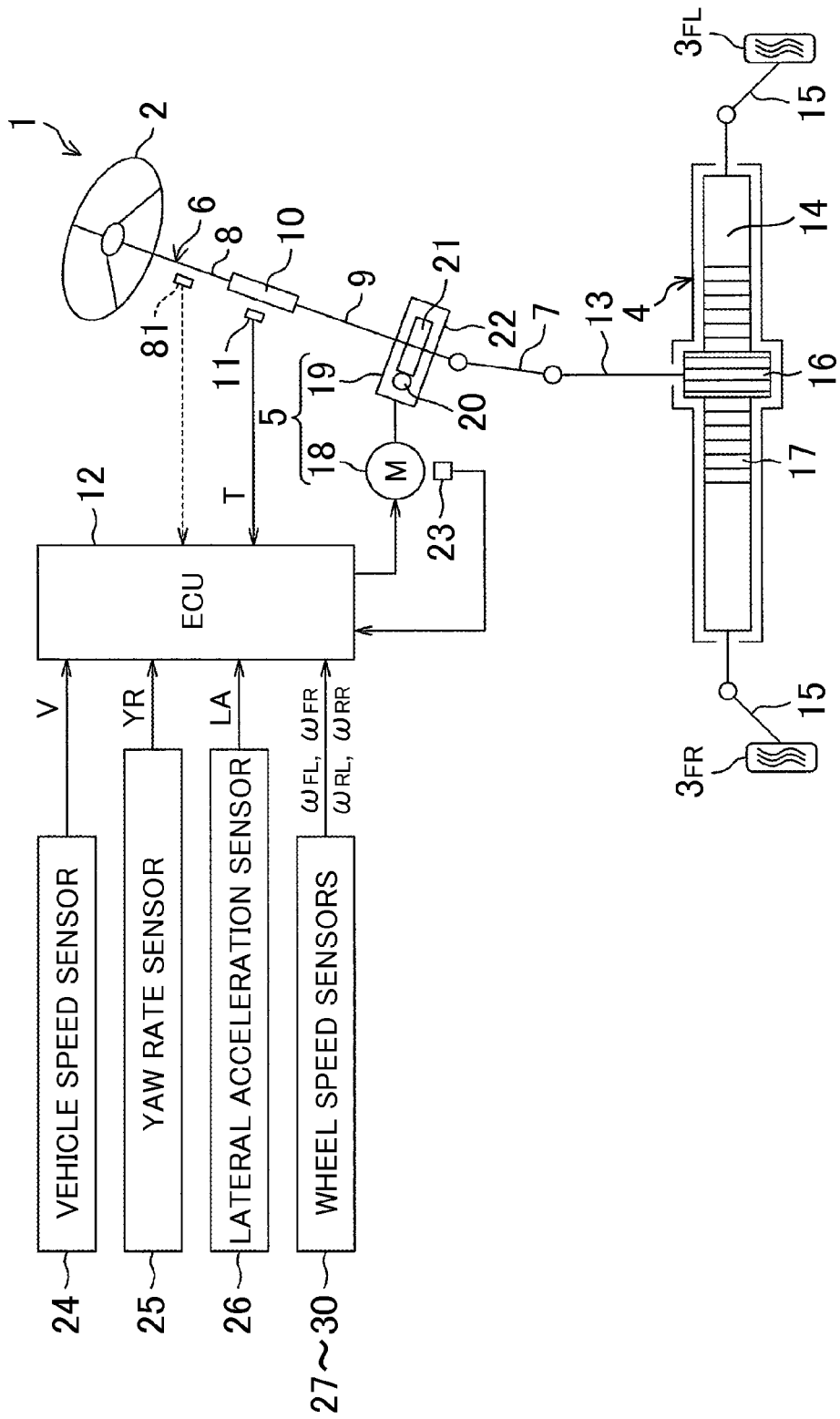
FIG. 1 is a schematic diagram showing a schematic configuration of an electric power steering apparatus according to an embodiment of the invention.

An embodiment of the invention will be described in detail below with reference to the accompanying drawings. FIG. 1 is a schematic diagram showing a schematic configuration of an electric power steering apparatus according to an embodiment of the invention. An electric power steering apparatus 1 includes a steering wheel 2 serving as a steering member that steers a vehicle, a steered mechanism 4 that steers steered wheels (a right front wheel $3_{FR}$ and a left front wheel $3_{FL}$) according to rotation of the steering wheel 2, and a steering assist mechanism 5 that assists the driver in steering operation. The steering wheel 2 is mechanically coupled to the steered mechanism 4 via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled via a torsion bar 10 so as to be rotatable relative to each other. A torque sensor 11 is placed around the torsion bar 10. The torque sensor 11 detects steering torque T applied to the steering wheel 2, based on the amount of relative displacement between the input shaft 8 and the output shaft 9. In the present embodiment, for example, the torque sensor 11 detects the steering torque T for steering to the right as a positive value, and detects the steering torque T for steering to the left as a negative value. The larger the absolute value of the detected steering torque is, the larger the magnitude of the steering torque is.

The steered mechanism 4 is a rack and pinion mechanism including a pinion shaft 13 and a rack shaft 14 as a steered shaft. The steered wheels (the right front wheel $3_{FR}$ and the left front wheel $3_{FL}$) are each coupled to a corresponding one of the ends of the rack shaft 14 via a tie rod 15 and a knuckle arm (not shown). The pinion shaft 13 is coupled to the intermediate shaft 7. The pinion shaft 13 rotates according to steering of the steering wheel 2. A pinion 16 is coupled to the distal end (the lower end in FIG. 1) of the pinion shaft 13.

The rack shaft 14 extends linearly in the lateral direction of the vehicle. A rack 17 that meshes with the pinion 16 is formed in an intermediate part of the rack shaft 14 in the axial direction. The pinion 16 and the rack 17 convert rotational motion of the pinion shaft 13 to axial motion of the rack shaft 14. The steered wheels (the right front wheel $3_{FR}$ and the left front wheel $3_{FL}$) can be steered by moving the rack shaft 14 in the axial direction.

When the steering wheel 2 is steered (rotated), this rotation is transmitted to the pinion shaft 13 via the steering shaft 6 and the intermediate shaft 7. Rotation of the pinion shaft 13 is converted to axial motion of the rack shaft 14 by the pinion 16 and the rack 17. The right front wheel $3_{FR}$ and the left front wheel $3_{FL}$ are steered in this manner. The steering assist mechanism 5 includes an electric motor 18 for steering assistance and a speed reducer 19 that transmits output torque of the electric motor 18 to the steered mechanism 4. In the present embodiment, the electric motor 18 is a three-phase brushless motor. A rotation angle sensor 23 that detects the rotation angle of a rotor (which is represented by the electrical angle of the rotor) of the electric motor 18 is placed near the electric motor 18. For example, a resolver is used as the rotation angle sensor 23. The speed reducer 19 is a worm gear mechanism including a worm shaft 20 and a worm wheel 21 that meshes with the worm shaft 20. The speed reducer 19 is accommodated in a gear housing 22 serving as a transmission mechanism housing.

The worm shaft 20 is rotationally driven by the electric motor 18. The worm wheel 21 is coupled to the output shaft 9 of the steering shaft 6. The worm wheel 21 is rotationally driven by the worm shaft 20. When the worm shaft 20 is rotationally driven by the electric motor 18, the worm wheel 21 is rotationally driven and the steering shaft 6 is rotated accordingly. The rotational motion of the steering shaft 6 is transmitted to the pinion shaft 13 via the intermediate shaft 7. Rotational motion of the pinion shaft 13 is converted to axial motion of the rack shaft 14. The right front wheel $3_{FR}$ and the left front wheel $3_{FL}$ are steered in this manner. That is, the right front wheel $3_{FR}$ and the left front wheel $3_{FL}$ are steered by rotationally driving the worm shaft 20 by the electric motor 18.

The vehicle is provided with a vehicle speed sensor 24 that detects the vehicle speed V, a yaw rate sensor 25 that detects the yaw rate YR of the vehicle, a lateral acceleration sensor 26 that detects lateral acceleration LA of the vehicle, and wheel speed sensors 27 to 30 that detects the rotation speeds ωFL, ωFR, ωRL, ωRR of the wheels, respectively. The rotation speeds ωFL, ωFR, ωRL, ωRR of the wheels represent the rotation speeds of the left front wheel $3_{FL}$, the right front wheel $3_{FR}$, a left rear wheel (not shown in FIG. 1), and a right rear wheel (not shown in FIG. 1), respectively.

An electronic control unit (ECU) 12 receives the steering torque T detected by the torque sensor 11, the vehicle speed V detected by the vehicle speed sensor 24, the yaw rate YR detected by the yaw rate sensor 25, the lateral acceleration LA detected by the lateral acceleration sensor 26, and the rotation speeds ωFL, ωFR, ωRL, ωRR of the wheels detected by the wheel speed sensors 27 to 30, an output signal of the rotation angle sensor 23, etc. The ECU 12 controls the electric motor 18 based on these inputs.

Figure 2:
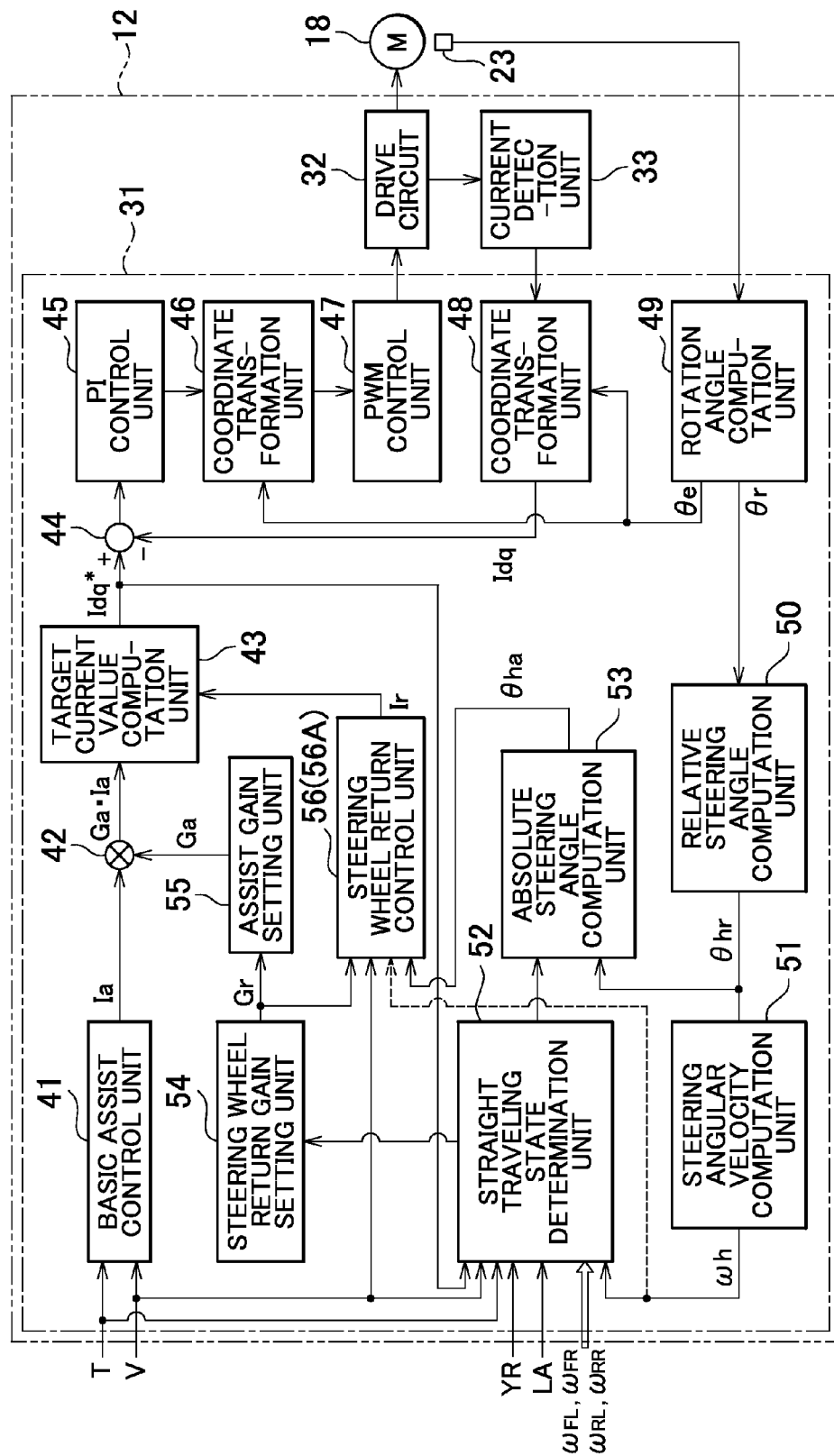
FIG. 2 is a block diagram showing an electrical configuration of an ECU.
Figure 3:
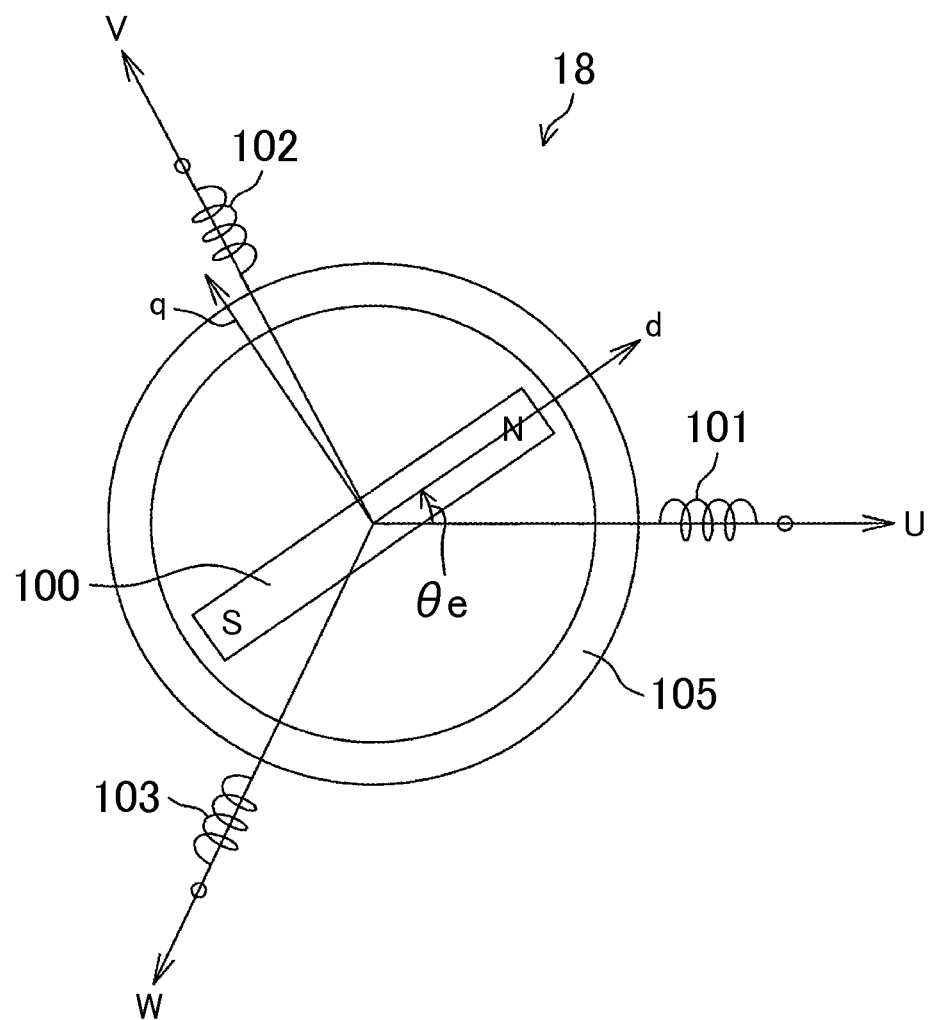
FIG. 3 is a schematic diagram illustrating the configuration of an electric motor.

FIG. 2 is a block diagram showing an electrical configuration of the ECU 12. The ECU 12 includes a microcomputer 31, a drive circuit 32 that is controlled by the microcomputer 31 to supply electric power to the electric motor 18, and a current detection unit 33 that detects a motor current flowing in the electric motor 18. For example, the electric motor 18 is a three-phase brushless motor. As illustrated in FIG. 3, the electric motor 18 includes a rotor 100 serving as a field magnet, and a stator 105 including a U-phase stator winding 101, a V-phase stator winding 102, and a W-phase stator winding 103. The electric motor 18 may be either of an inner rotor type in which a stator is placed outside a rotor so as to face the rotor, or of an outer rotor type in which a stator is placed inside a cylindrical rotor so as to face the rotor.

In order to drive and control the motor, a three-phase fixed coordinate system (UVW coordinate system) is defined in which U-, V-, and W-axes extend in the directions of the central axes of the U-, V-, and W-phase stator windings 101, 102, 103, respectively. A two-phase rotating coordinate system (dq coordinate system, actual rotating coordinate system) is defined in which a d-axis (magnetic pole axis) extends in the magnetic pole direction from the S-pole to the N-pole of the rotor 100 and a q-axis (torque axis) extends in a direction perpendicular to the d-axis in the rotary plane of the rotor 100. The dq coordinate system is a rotating coordinate system that rotates together with the rotor 100. Since only a q-axis current contributes to torque generation by the rotor 100 in the dq coordinate system, a d-axis current is set to zero, and the q-axis current need only be controlled according to desired torque. A rotation angle (electrical angle) θe of the rotor 100 is a rotation angle of the d-axis with respect to the U-axis. The dq coordinate system is an actual rotating coordinate system that rotates with respect to the UVW coordinate system according to the rotor rotation angle θe. The use of the rotor rotation angle θe makes it possible to perform coordinate transformation between the UVW coordinate system and the dq coordinate system.

Referring back to FIG. 2, a microcomputer 31 includes a CPU and a memory (ROM, RAM, nonvolatile memory, etc.), and functions as a plurality of functional processing units by executing a predetermined program. The functional processing units include a basic assist control unit 41, an assist gain multiplication unit 42, a target current value computation unit 43, a current deviation computation unit 44, a proportional integral (PI) control unit 45, a coordinate transformation unit 46, a pulse width modulation (PWM) control unit 47, a coordinate transformation unit 48, a rotation angle computation unit 49, a relative steering angle computation unit 50, a steering angular velocity computation unit 51, a straight traveling state determination unit 52, an absolute steering angle computation unit 53, a steering wheel return gain setting unit 54, an assist gain setting unit 55, and a steering wheel return control unit 56.

The rotation angle computation unit 49 computes rotation angles θe, θr of the rotor of the electric motor 18 based on an output signal of the rotation angle sensor 23, and outputs the computed rotation angles θe, θr. θe is an electrical angle, and θr is a mechanical angle (mechanical rotation angle of the rotor with respect to the stator). Each of θe and θr is not an absolute angle of multiple rotations of the rotor with the rotation angle of the rotor corresponding to a steering neutral position described below as an origin, but a relative angle in a sense that it is not the absolute angle of multiple rotations. The rotor rotation angle θe (electrical angle) computed by the rotation angle computation unit 49 is output to each of the coordinate transformation units 46, 48. The rotation angle θr (mechanical angle) computed by the rotation angle computation unit 49 is output to the relative steering angle computation unit 50.

The relative steering angle computation unit 50 computes a relative steering angle θhr serving as a relative steering angle by dividing the rotation angle θr computed by the rotation angle computation unit 49 by the reduction gear ratio of the speed reducer 19. The relative steering angle θhr computed by the relative steering angle computation unit 50 is output to the steering angular velocity computation unit 51 and the absolute steering angle computation unit 53. The steering angular velocity computation unit 51 computes a steering angular velocity ωh by differentiating the relative steering angle θhr computed by the relative steering angle computation unit 50 with respect to time. In the present embodiment, the steering angular velocity ωh takes a positive value when the electric motor 18 is rotating in a rotation direction corresponding to a rightward steering direction, and takes a negative value when the electric motor 18 is rotating in a rotation direction corresponding to a leftward steering direction.

Figure 4:
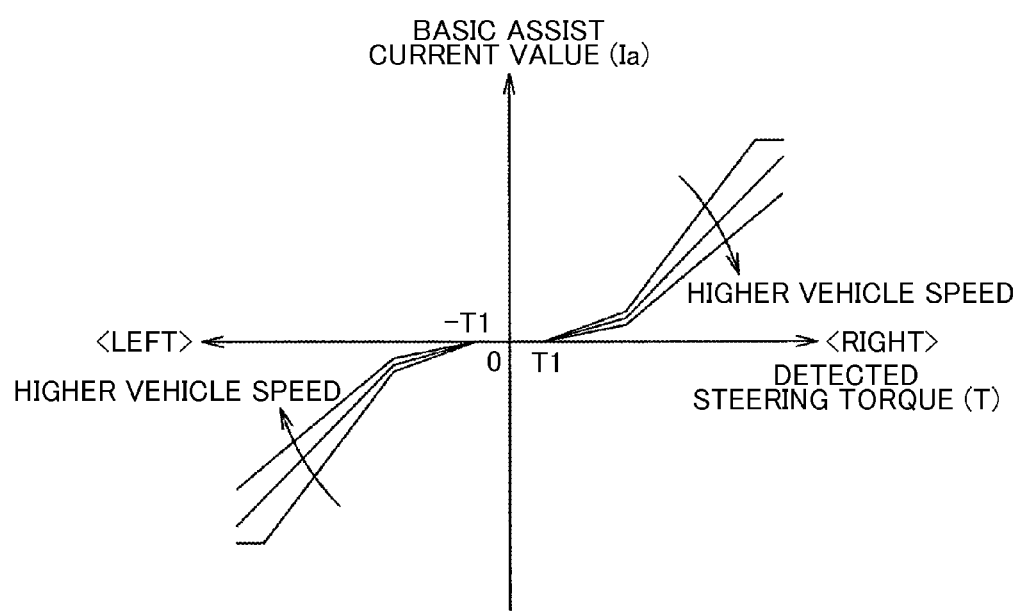
FIG. 4 is a graph showing an example of setting a basic assist current value Ia with respect to detected steering torque T.

The basic assist control unit 41 sets a basic assist current value Ia based on the steering torque T detected by the torque sensor 11 and the vehicle speed V detected by the vehicle speed sensor 24. FIG. 4 shows an example of setting the basic assist current value Ia with respect to the detected steering torque T. For example, the detected steering torque T takes a positive value in the case where it is the torque for steering to the right, and takes a negative value in the case where it is the torque for steering to the left. The basic assist current value Ia takes a positive value when a steering assist force for steering to the right should be generated from the electric motor 18, and takes a negative value when a steering assist force for steering to the left should be generated from the electric motor 18. The basic assist current value Ia takes a positive value when the detected steering torque T has a positive value, and takes a negative value when the detected steering torque T has a negative value.

The basic assist current value Ia is set to zero when the detected steering torque T has a very small value in the range of −T1 to T1 (torque dead zone) (e.g., T1=0.4 Nm). In the case where the detected steering torque T is smaller than −T1 or larger than T1, the basic assist current value Ia is set so that its absolute value increases as the absolute value of the detected steering torque T increases. The basic assist current value Ia is set so that its absolute value decreases as the vehicle speed V detected by the vehicle speed sensor 24 increases. Thus, a large steering assist force can be generated when the vehicle is traveling at low speeds, and the steering assist force can be reduced when the vehicle is traveling at high speeds.

The assist gain multiplication unit 42 corrects the basic assist current value Ia by multiplying the basic assist current value Ia set by the basic assist control unit 41 by assist gain Ga that is set by the assist gain setting unit 55 described below. The assist gain Ga corresponds to the first correction gain of the invention, and the assist gain multiplication unit corresponds to the first multiplication device of the invention. The target current value computation unit 43 sets a current value to be supplied to the dq coordinate system as a target current value based on a compensating current value Ir that is computed by the steering wheel return control unit 56 described below and a corrected basic assist current value Ga·Ia produced by the assist gain multiplication unit 42. First, the target current value computation unit 43 calculates, as a q-axis current command value Iq*, the sum (Ga·Ia+Ir) of the corrected basic assist current value Ga·Ia and the compensating current value Ir that is calculated by the steering wheel return control unit 56. Next, the target current value computation unit 43 sets a d-axis current command value Id* to zero (hereinafter the d-axis current command value Id* and the q-axis current command value Iq* are sometimes collectively referred to as the "two-phase current command value Idq*"). The two-phase current command value Idq* set by the target current value computation unit 43 is output to the current deviation computation unit 44.

The current detection unit 33 detects a U-phase current IU, a V-phase current IV, and a W-phase current IW of the electric motor 18. Hereinafter these currents IU, IV, IW are sometimes collectively referred to as the "three-phase detection current IUVW." The three-phase detection current IUVW detected by the current detection unit 33 is output to the coordinate transformation unit 48.

The coordinate transformation unit 48 transforms the three-phase detection current IUVW (the U-phase current IU, the V-phase current IV, and the W-phase current IW) of the UVW coordinate system which is detected by the current detection unit 33 to two-phase detection currents Id, Iq of the dq coordinate system. Hereinafter the two-phase detection currents Id, Iq are sometimes collectively referred to as the "two-phase detection current Idq." This coordinate transformation uses the rotor rotation angle θe computed by the rotation angle computation unit 49.

The current deviation computation unit 44 computes the deviation between the two-phase current command value Idq* that is set by the target current value computation unit 43 and the two-phase detection current Idq that is received from the coordinate transformation unit 48. More specifically, the current deviation computation unit 44 computes the deviation of the d-axis detection current Id from the d-axis current command value Id* and the deviation of the q-axis detection current Iq from the q-axis current command value Iq*. These deviations are output to the PI control unit 45.

The PI control unit 45 proportionally integrates the current deviations computed by the current deviation computation unit 44 to produce a d-axis voltage command value Vd* and a q-axis voltage command value Vq* which are to be applied to the electric motor 18. Hereinafter the d-axis voltage command value Vd* and the q-axis voltage command value Vq* are sometimes collectively referred to as the "two-phase voltage command value Vdq*." The two-phase voltage command value Vdq* is output to the coordinate transformation unit 46.

The coordinate transformation unit 46 transforms the two-phase voltage command value Vdq* to a three-phase voltage command value VUVW*. This coordinate transformation uses the rotor rotation angle θe computed by the rotation angle computation unit 49. The three-phase voltage command value VUVW* is comprised of a U-phase voltage command value VU*, a V-phase voltage command value VV*, and a W-phase voltage command value VW*. This three-phase voltage command value VUVW* is output to the PWM control unit 47.

The PWM control unit 47 generates a U-phase PWM control signal, a V-phase PWM control signal, and a W-phase PWM control signal which have duty cycles corresponding to the U-phase voltage command value VU*, the V-phase voltage command value VV*, and the W-phase voltage command value VW*, respectively, and supplies these control signals to the drive circuit 32. The drive circuit 32 is formed by a three-phase inverter circuit corresponding to U-phase, V-phase, and W-phase. A power device forming this inverter circuit is controlled by the PWM control signal received from the PWM control unit 47, whereby voltages corresponding to the three-phase voltage command value VUVW* are applied to the U-, V-, and W-phase stator windings 101, 102, 103 of the electric motor 18.

The current deviation computation unit 44 and the PI control unit 45 form a current feedback control device. The current feedback control device functions to control the motor current flowing in the electric motor 18 so that the motor current becomes closer to the two-phase current command value Idq* computed by the target current value computation unit 43.

The straight traveling state determination unit 52, the absolute steering angle computation unit 53, the steering wheel return gain setting unit 54, the assist gain setting unit 55, and the steering wheel return control unit 56 will be described in detail below. The straight traveling state determination unit 52 determines the steering neutral position by determining whether the vehicle is in a straight traveling state or not. For example, the straight traveling state determination unit 52 determines whether the vehicle is in the straight traveling state or not based on the steering torque T that is detected by the torque sensor 11, the vehicle speed V that is detected by the vehicle speed sensor 24, the yaw rate YR that is detected by the yaw rate sensor 25, the lateral acceleration LA that is detected by the lateral acceleration sensor 26, the rotation speeds ωFL, ωFR, ωRL, ωRR of the wheels which are detected by the wheel speed sensors 27 to 30, the steering angular velocity ωh that is computed by the steering angular velocity computation unit 51, and the two-phase current command value Idq* (i.e., the q-axis current command value Iq*).

Specifically, the straight traveling state determination unit 52 determines in every predetermined computation cycle whether a predetermined straight traveling state determination condition has been satisfied or not. If it is determined that the predetermined straight traveling state determination condition has been satisfied, the straight traveling state determination unit 52 determines that the vehicle is in the straight traveling state. The predetermined straight traveling state determination condition is that all of the following first to seventh conditions are satisfied.

First Condition: the vehicle speed V is equal to or higher than a predetermined threshold A (V≥A and A>0). For example, the threshold A is set to 20 [km/h]. Second Condition: the absolute value |YR| of the yaw rate is equal to or smaller than a predetermined threshold B (|YR|≤B and B>0). For example, the threshold B is set to 2.5 [deg/sec]. Third Condition: the absolute value of the sum of steering torque T and motor torque Tm calculated as the torque applied to the steering shaft from the q-axis current command value Iq* is equal to or smaller than a predetermined threshold C (|Tm+T|≤C and C>0). For example, the threshold C is set to 5 [Nm].

Forth Condition: the absolute value |LA| of the lateral acceleration is equal to or smaller than a predetermined threshold D (|LA|≤D and D>0). For example, the threshold D is set to 1.5/9.8 [G]=1.5 [m/s2]. Fifth Condition: the absolute value |ωh| of the steering angular velocity is equal to or smaller than a predetermined threshold E (|ωh|≤E and E>0). For example, the threshold E is set to 15 [deg/sec].

Sixth Condition: the absolute value of the difference between the front and rear wheel speeds is equal to or smaller than a predetermined threshold F (F>0). For example, the difference between the front and rear wheel speeds can be obtained as the difference between a mean value of the rotation speeds of the right and left front wheels and a mean value of the rotation speeds of the right and left rear wheels, namely [{(ωFR+ωFL)/2}−{(ωRR+ωRL)/2}]. In this case, the sixth condition can be represented by "|{(ωFR+ωFL)/2}−{(ωRR+ωRL)/2}||≤F." For example, the threshold F is set to 5 [km/h].

Seventh Condition: the absolute value of the difference between the right and left wheel speeds is equal to or smaller than a predetermined threshold G (G>0). For example, the difference between the right and left wheel speeds can be obtained as the difference between a mean value of the rotation speeds of the left front wheel and the left rear wheel and a mean value of the rotation speeds of the right front wheel and the right rear wheel, namely [{(ωFL+ωRL)/2}−{(ωFR+ωRR)/2}]. In this case, the seventh condition can be represented by "|{(ωFL+ωRL)/2}−{(ωFR+ωRR)/2}||≤G." For example, the threshold G is set to 2 [km/h].

The absolute steering angle computation unit 53 computes an absolute steering angle θha based on the following expression (1)

$$\theta ha = \theta hr - \theta c \quad (1)$$

where θc represents a steering central angle, and θhr represents a relative steering angle. The steering central angle θc is the relative steering angle θhr at the time it is determined by the straight traveling state determination unit 52 that the vehicle is in the straight traveling state. That is, the absolute steering angle computation unit 53 is allowed to compute the absolute steering angle after it is determined by the straight traveling state determination unit 52 that the vehicle is in the straight traveling state. The absolute steering angle computation unit 53 therefore does not compute the absolute steering angle θha until it is determined by the straight traveling state determination unit 52 that the vehicle is in the straight traveling state after the ECU 12 is turned on. The absolute steering angle θha computed by the absolute steering angle computation unit 53 is output to the steering wheel return control unit 56.

Figure 5:
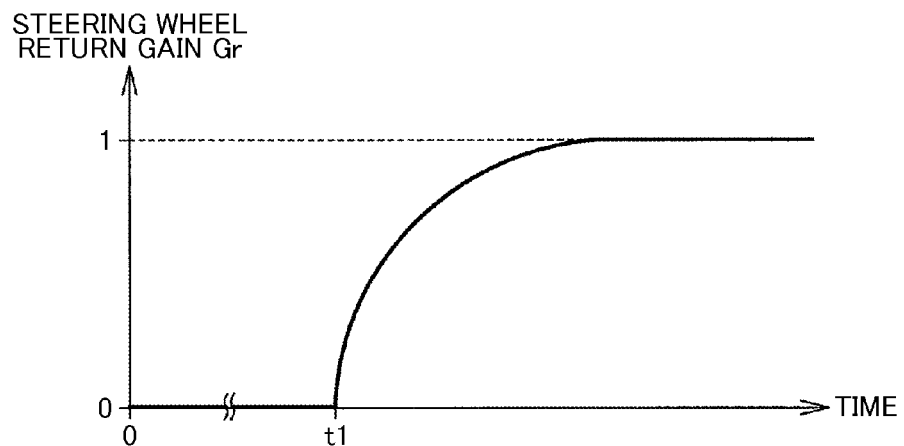
FIG. 5 is a graph showing an example of setting steering wheel return gain Gr.

The steering wheel return gain setting unit 54 sets steering wheel return gain Gr according to whether it is before or after the straight traveling state determination unit 52 determines that the vehicle is in the straight traveling state. The steering wheel return gain Gr corresponds to the second correction gain of the invention. FIG. 5 shows an example of setting the steering wheel return gain Gr. In FIG. 5, "t1" represents the time it is determined by the straight traveling state determination unit 52 that the vehicle is in the straight traveling state. Before it is determined by the straight traveling state determination unit 52 that the vehicle is in the straight traveling state, the steering wheel return gain Gr is set to zero. After it is determined that the vehicle is in the straight traveling state, the steering wheel return gain Gr is gradually increased from zero to one and is then fixed to one. The steering wheel return gain Gr set by the steering wheel return gain setting unit 54 is output to the assist gain setting unit 55 and the steering wheel return control unit 56.

Figure 6:
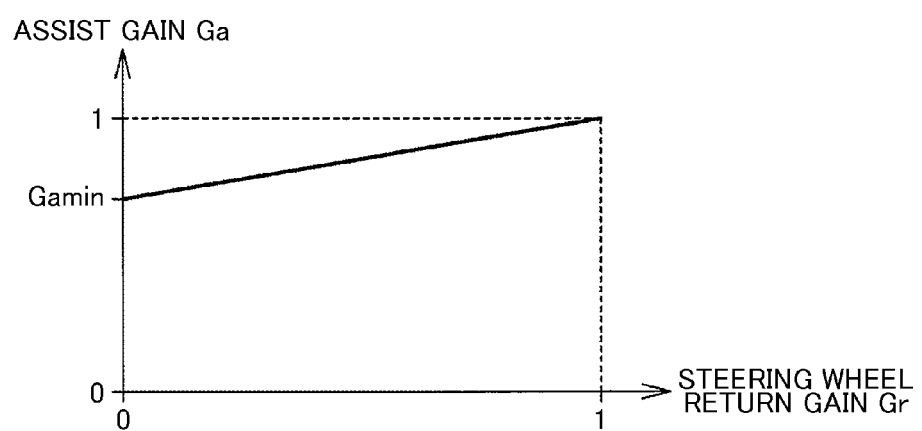
FIG. 6 is a graph showing an example of setting assist gain Ga with respect to the steering wheel return gain Gr.

The assist gain setting unit 55 sets the assist gain (correction gain) Ga for correcting the basic assist current value Ia, based on the steering wheel return gain Gr. FIG. 6 shows an example of setting the assist gain Ga with respect to the steering wheel return gain Gr. The assist gain Ga is set so as to have a predetermined lower limit Gamin (e.g., 0.7) less than one when the steering wheel return gain Gr is zero, and so as to monotonously increase to one with an increase in steering wheel return gain Gr. Accordingly, before it is allowed to compute the absolute steering angle, the assist gain Ga is fixed to the lower limit Gamin less than one. After it is allowed to compute the absolute steering angle, the assist gain Ga is gradually increased from the lower limit Gamin to one and is then fixed to one.

The assist gain Ga set by the assist gain setting unit 55 is output to the assist gain multiplication unit 42. The assist gain multiplication unit 42 corrects the basic assist current value Ia by multiplying the basic assist current value Ia set by the basic assist control unit 41 by the assist gain Ga. The corrected basic assist current value Ga·Ia produced by the assist gain multiplication unit 42 is output to the target current value computation unit 43.

Before it is allowed to compute the absolute steering angle, the assist gain Ga is fixed to the lower limit Gamin less than one, and therefore the basic assist current value Ia set by the basic assist control unit 41 is corrected so that its absolute value is decreased. Immediately after it is allowed to compute the absolute steering angle, the assist gain Ga is gradually increased from the lower limit Gamin to one, and the rate of decrease in absolute value of the basic assist current value Ia therefore decreases gradually. After the assist gain Ga reaches one, the assist gain Ga is fixed to one, and the basic assist current value Ia received by the assist gain multiplication unit 42 is therefore output as it is from the assist gain multiplication unit 42. Accordingly, the steering wheel return gain setting unit 54, the assist gain setting unit 55, and the assist gain multiplication unit 42 form the basic assist current value correction device that corrects the basic assist current value Ia set by the basic assist control unit 41 according to whether it is before or after the absolute steering angle computation unit 53 is allowed to compute the absolute steering angle.

The steering wheel return control unit 56 generates the compensating current value (the compensating current value for steering wheel return control) Ir for improving operationality at the time of returning the steering wheel 2 to the neutral position. The steering wheel return control unit 56 computes the compensating current value Ir based on the absolute steering angle θha computed by the absolute steering angle computation unit 53, the steering wheel return gain Gr set by the steering wheel return gain setting unit 54, and the vehicle speed V detected by the vehicle speed sensor 24.

Figure 7:
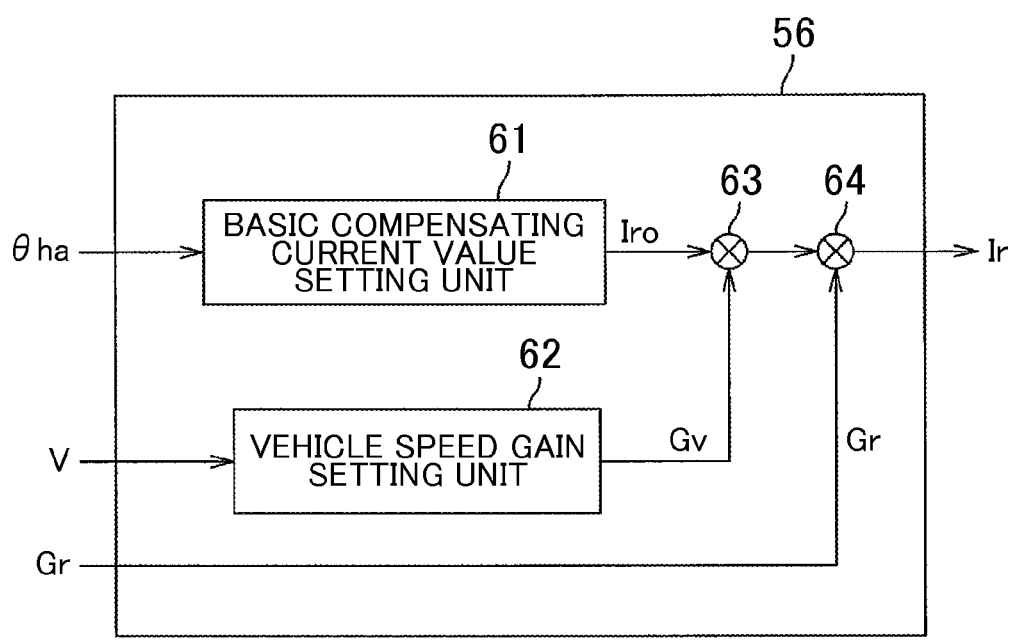
FIG. 7 is a block diagram showing a configuration example of a steering wheel return control unit.
Figure 8:
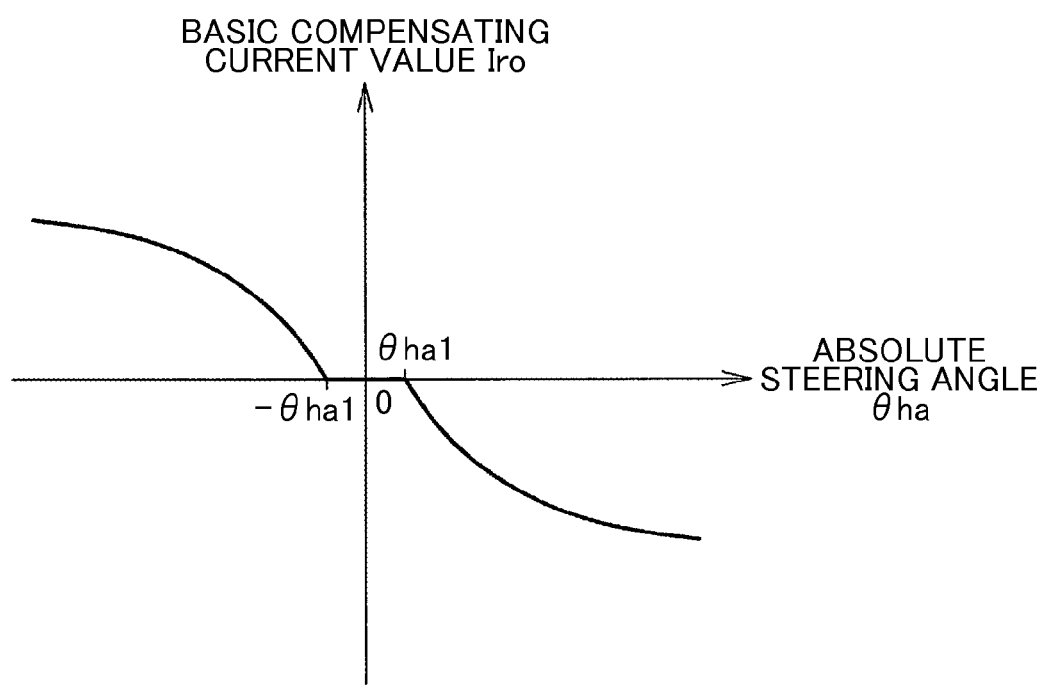
FIG. 8 is a graph showing an example of setting a basic compensating current value Iro with respect to an absolute steering angle θha.

FIG. 7 is a block diagram showing a configuration example of the steering wheel return control unit 56. The steering wheel return control unit 56 includes a basic compensating current value setting unit 61, a vehicle speed gain setting unit 62, a vehicle speed gain multiplication unit 63, and a steering wheel return gain multiplication unit 64. The basic compensating current value setting unit 61 sets a basic compensating current value Iro based on the absolute steering angle θha computed by the absolute steering angle computation unit 53. FIG. 8 shows an example of setting the basic compensating current value Iro with respect to the absolute steering angle θha. The absolute steering angle θha represents the amount of rotation, namely the rotation angle, of the steering wheel 2 from its neutral position in both forward and reverse directions. The rotation angle from the neutral position to the right (in the clockwise direction) takes a positive value, and the rotation angle from the neutral position to the left (in the counterclockwise direction) takes a negative value. The basic compensating current value Iro takes a negative value when the absolute steering angle θha is positive, and takes a positive value when the absolute steering angle θha is negative. That is, the basic compensating current value Iro is a current for generating torque that is applied in such a direction that the steering wheel 2 returns to the neutral position. Hereinafter the torque that is applied in such a direction that returns the steering wheel 2 to the neutral position is referred to as the "steering wheel return torque."

Figure 9:
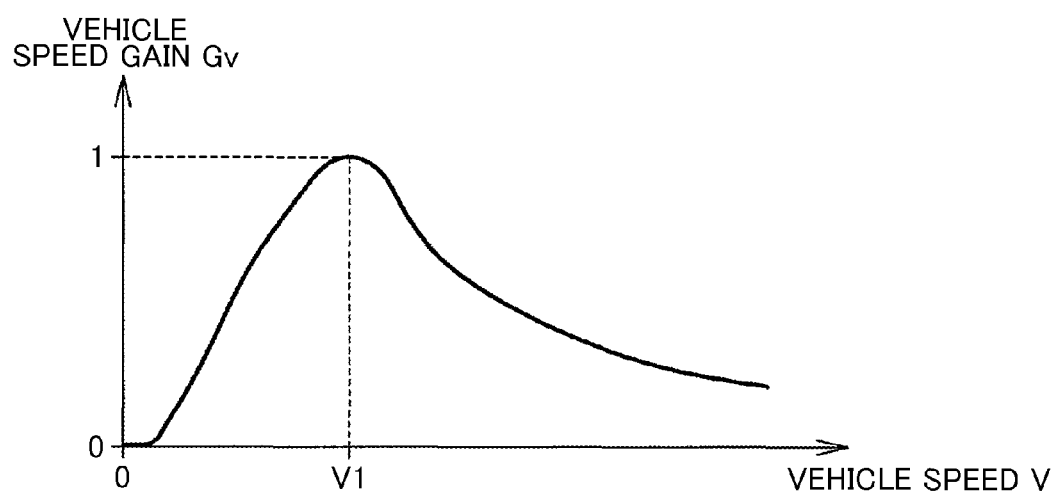
FIG. 9 is a graph showing an example of setting vehicle speed gain Gv with respect to a vehicle speed V.

In FIG. 8, the basic compensating current value Iro is set to zero when the absolute steering angle θha has a very small value in the range of −θha1 to θha1. For example, θha1 is set to 3 deg. In the case where the absolute steering angle θha is smaller than −θha1 or larger than θha1, the basic compensating current value Iro is set so that its absolute value increases as the absolute value of the absolute steering angle θha increases. The vehicle speed gain setting unit 62 sets vehicle speed gain Gv based on the vehicle speed V detected by the vehicle speed sensor 24. FIG. 9 shows an example of setting the vehicle speed gain Gv with respect to the vehicle speed V. The vehicle speed gain Gv is set to zero when the vehicle speed V is around zero. When the vehicle speed V is V1 or less, the vehicle speed gain Gv is set so as to increase from zero to one with an increase in vehicle speed V. When the vehicle speed V becomes higher than V1, the vehicle speed gain Gv is set so as to decrease with an increase in vehicle speed V. For example, V1 is set to a predetermined value in the range of 20 km/h to 30 km/h. The reason why the vehicle speed gain Gv is set so as to decrease with an increase in vehicle speed V when the vehicle speed V becomes higher than V1 is because self-aligning torque that is applied to the steered wheels increases if the vehicle speed V becomes higher than V1.

The vehicle speed gain multiplication unit 63 corrects the basic compensating current value Iro by multiplying the basic compensating current value Iro set by the basic compensating current value setting unit 61 by the vehicle speed gain Gv set by the vehicle speed gain setting unit 62. The vehicle speed gain multiplication unit corresponds to the second multiplication device of the invention. The steering wheel return gain multiplication unit 64 computes a final compensating current value Ir (=Gr·Gv·Iro) by multiplying a corrected basic compensating current value Gv·Iro produced by the vehicle speed gain multiplication unit 63 by the steering wheel return gain Gr (see FIG. 5) set by the steering wheel return gain setting unit 54. The final compensating current value Ir (=Gr·Gv·Iro) computed by the steering wheel return gain multiplication unit 64 is output to the target current value computation unit 43.

Before it is allowed to compute the absolute steering angle, the steering wheel return gain Gr is zero, and therefore the compensating current value Ir (=Gr·Gv·Iro) is zero. Immediately after it is allowed to compute the absolute steering angle, the steering wheel return gain Gr is gradually increased from zero to one, and therefore the compensating current value Ir gradually becomes closer to the corrected basic compensating current value Gv·Iro produced by the vehicle speed gain multiplication unit 63. After the steering wheel return gain Gr reaches one, the steering wheel return gain Gr is fixed to one, and the compensating current value Ir therefore becomes equal to the corrected basic compensating current value Gv·Iro produced by the vehicle speed gain multiplication unit 63.

The target current value computation unit 43 shown in FIG. 2 sets the sum (Ga·Ia+Ir) of the corrected basic assist current value Ga·Ia produced by the assist gain multiplication unit 42 and the compensating current value Ir computed by the steering wheel return control unit 56 as the q-axis current command value Iq*. The target current value computation unit 43 sets the d-axis current command value Id* to zero. As described above, before it is allowed to compute the absolute steering angle, the steering wheel return gain Gr is zero (see FIG. 5), and therefore the compensating current value Ir (=Gr·Gv·Iro) for generating the steering wheel return torque is zero. Accordingly, before it is allowed to compute the absolute steering angle, the compensating current value Ir is not reflected in the q-axis current command value Iq*. However, after it is allowed to compute the absolute steering angle, the steering wheel return gain Gr is gradually increased from zero to one, and is then fixed to one. Accordingly, the compensating current value Ir (=Gr·Gv·Iro) for generating the steering wheel return torque is produced. The compensating current value Ir is therefore reflected in the q-axis current command value Iq* after it is allowed to compute the absolute steering angle.

In the present embodiment, before it is allowed to compute the absolute steering angle, the assist gain Ga is fixed to the lower limit Gamin less than one (see FIGS. 5 and 6), and therefore the basic assist current value Ia set by the basic assist control unit 41 is corrected so that its absolute value is decreased. After it is allowed to compute the absolute steering angle, the assist gain Ga is gradually increased from zero to one, and is then fixed to one. Accordingly, the basic assist current value Ia is not decreased after the assist gain Ga is fixed to one.

In the present embodiment, before it is allowed to compute the absolute steering angle, namely when the compensating current value output from the steering wheel return control unit is not reflected in assist torque, the basic assist current value Ia is corrected so as to complement the compensating current value. Such correction is not made after it is allowed to compute the absolute steering angle, namely when the compensating current value output from the steering wheel return control unit is reflected in the assist torque. This can eliminate degradation in steering feel which is caused by the compensating current value not being reflected before it is allowed to compute the absolute steering angle, and can suppress the difference in steering feel between before and after it is allowed to compute the absolute steering angle. As a result, an uncomfortable steering feel can be suppressed, and the steering feel can be improved.

In the present embodiment, immediately after it is allowed to compute the absolute steering angle, the assist gain Ga is gradually increased from the predetermined value to one, and the steering wheel return gain Gr is gradually increased from zero to one. Accordingly, the target current value (q-axis current command value Iq*) can be smoothly changed before and after it is allowed to compute the absolute steering angle. This can further improve the steering feel.

Figure 10:
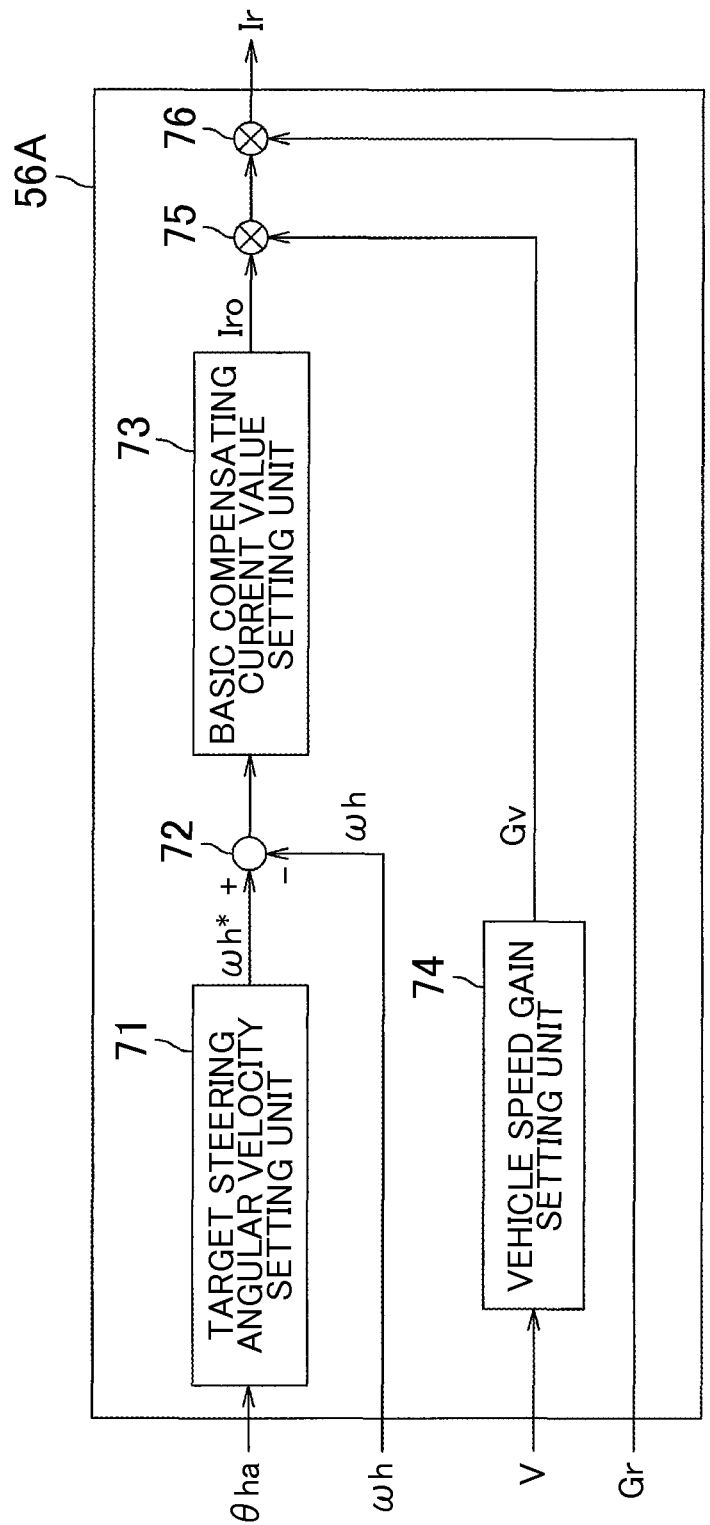
FIG. 10 is a block diagram showing another configuration example of the steering wheel return control unit.

FIG. 10 is a block diagram showing another configuration example of the steering wheel return control unit. A steering wheel return control unit 56A receives the steering angular velocity ωh computed by the steering angular velocity computation unit 51 as shown by dashed line in FIG. 2, in addition to the steering wheel return gain Gr set by the steering wheel return gain setting unit 54, the absolute steering angle θha computed by the absolute steering angle computation unit 53, and the vehicle speed V detected by the vehicle speed sensor 24.

Figure 11:
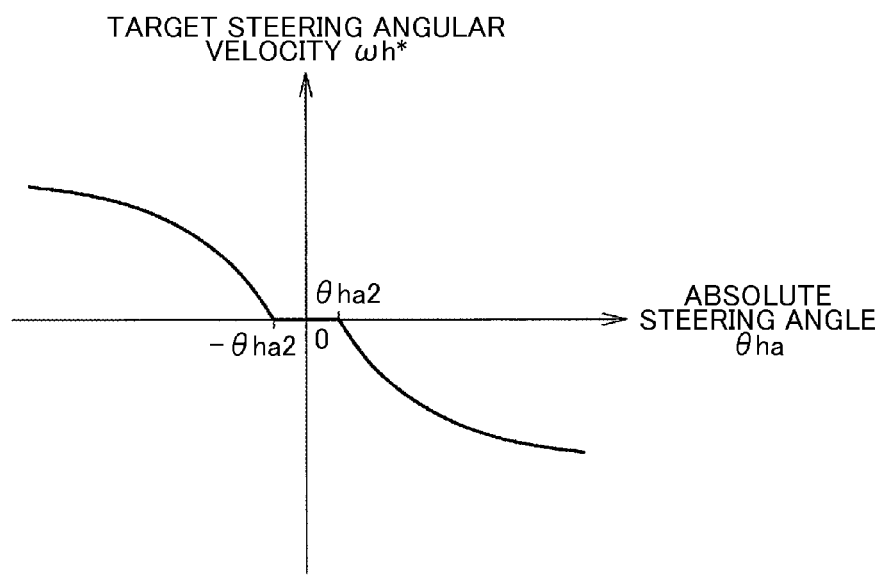
FIG. 11 is a graph showing an example of setting a target steering angular velocity ωh* with respect to the absolute steering angle θha.

The steering wheel return control unit 56A includes a target steering angular velocity setting unit 71, an angular velocity deviation computation unit 72, a basic compensating current value setting unit 73, a vehicle speed gain setting unit 74, a vehicle speed gain multiplication unit 75, and a steering wheel return gain multiplication unit 76. The target steering angular velocity setting unit 71 sets a target steering angular velocity ωh* serving as a target value of the steering angular velocity based on the absolute steering angle θha computed by the absolute steering angle computation unit 53. FIG. 11 shows an example of setting the target steering angular velocity ωh* with respect to the absolute steering angle θha. The target steering angular velocity ωh* takes a negative value when the absolute steering angle θha is positive, and takes a positive value when the absolute steering angle θha is negative. The target steering angular velocity ωh* is set to zero when the absolute steering angle θha has a very small value in the range of −θha2 to θha2. For example, in the case where the absolute steering angle θha is smaller than −θha2 or larger than θha2, the target steering angular velocity ωh* is set so that its absolute value increases as the absolute value of the absolute steering angle θha increases.

Figure 12:
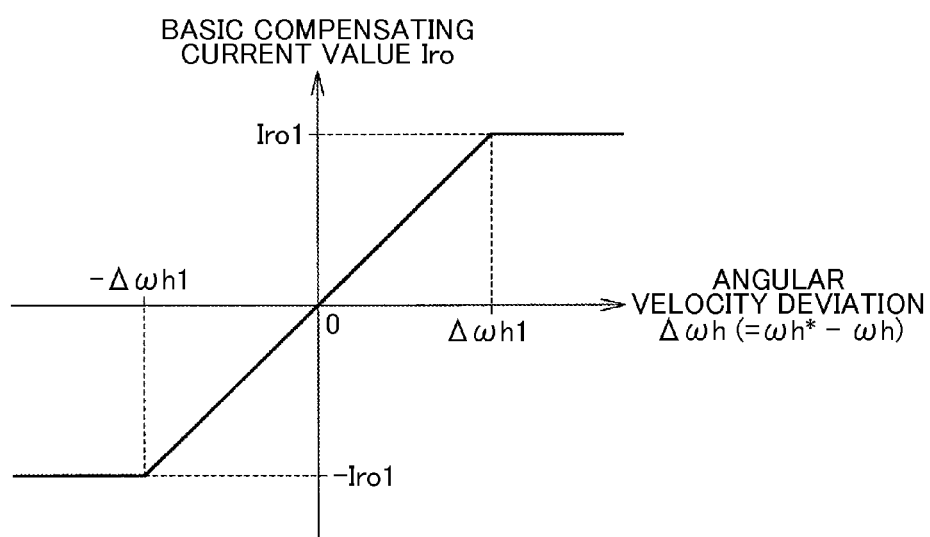
FIG. 12 is a graph showing an example of setting the basic compensating current value Iro with respect to an angular velocity deviation Δωh.

The angular velocity deviation computation unit 72 computes the deviation Δωh (=ωh*−ωh) between the target steering angular velocity ωh* that is set by the target steering angular velocity setting unit 71 and the steering angular velocity ωh that is computed by the steering angular velocity computation unit 51. The basic compensating current value setting unit 73 sets a basic compensating current value Iro based on the angular velocity deviation Δωh computed by the angular velocity deviation computation unit 72. FIG. 12 shows an example of setting the basic compensating current value Iro with respect to the angular velocity deviation Δωh. The basic compensating current value Iro takes a positive value when the angular velocity deviation Δωh is positive, and takes a negative value when the angular velocity deviation Δωh is negative. The basic compensating current value Iro is a current for generating the steering wheel return torque.

When the angular velocity deviation Δωh is in the range of zero to Δωh1 (e.g., Δωh1=3 deg/sec), the basic compensating current value Iro is set so as to monotonously increase from zero to an upper limit Iro1 (Iro1>0) with an increase in angular velocity deviation Δωh. When the angular velocity deviation Δωh becomes larger than Δωh1, the basic compensating current value Iro is set so as to be fixed to the upper limit Iro1. When the angular velocity deviation Δωh is in the range of zero to −Δωh1, the basic compensating current value Iro is set so as to monotonously decrease from zero to a lower limit −Iro1 with a decrease in angular velocity deviation Δωh. When the angular velocity deviation Δωh becomes smaller than −Δωh1, the basic compensating current value Iro is set so as to be fixed to the lower limit −Iro1.

The vehicle speed gain setting unit 74 sets the vehicle speed gain Gv based on the vehicle speed V detected by the vehicle speed sensor 24. For example, the vehicle speed gain setting unit 74 sets the vehicle speed gain Gv based on the relation between the vehicle speed V and the vehicle speed gain Gv shown in FIG. 9, like the vehicle speed gain setting unit 62 of FIG. 7. The vehicle speed gain multiplication unit 75 corrects the basic compensating current value Iro by multiplying the basic compensating current value Iro set by the basic compensating current value setting unit 73 by the vehicle speed gain Gv set by the vehicle speed gain setting unit 74.

The steering wheel return gain multiplication unit 76 calculates a final compensating current value Ir (=Gr·Gv·Iro) by multiplying the corrected basic compensating current value Gv·Iro produced by the vehicle speed gain multiplication unit 75 by the steering wheel return gain Gr set by the steering wheel return gain setting unit 54. Before it is allowed to compute the absolute steering angle, the steering wheel return gain Gr is zero, and therefore the compensating current value Ir (=Gr·Gv·Iro) that is output from the steering wheel return control unit is zero. Immediately after it is allowed to compute the absolute steering angle, the steering wheel return gain Gr is gradually increased from zero to one, and therefore the compensating current value Ir gradually becomes closer to the corrected basic compensating current value Gv·Iro produced by the vehicle speed gain multiplication unit 75. After the steering wheel return gain Gr reaches one, the steering wheel return gain Gr is fixed to one, and the compensating current value Ir therefore becomes equal to the corrected basic compensating current value Gv·Iro produced by the vehicle speed gain multiplication unit 75.

Although the embodiment of the invention is described above, the invention can be carried out in other embodiments. For example, in the above embodiment, the steering wheel return gain Gr is set to zero before it is determined that the vehicle is in the straight traveling state, and is gradually increased from zero to one and is then fixed to one after it is determined that the vehicle is in the straight traveling state, as shown in FIG. 5. In other embodiments, however, the steering wheel return gain Gr may be set to zero before it is determined that the vehicle is in the straight traveling state, and may be set to one after it is determined that the vehicle is in the straight traveling state.

In the above embodiment, as shown in FIGS. 5 and 6, the assist gain Ga is fixed to the lower limit Gamin less than one before it is allowed to compute the absolute steering angle, and is gradually increased from the lower limit Gamin to one and is then fixed to one after it is allowed to compute the absolute steering angle. In other embodiments, however, the assist gain Ga may be set to the lower limit Gamin less than one before it is allowed to compute the absolute steering angle, and may be set to one after it is allowed to compute the absolute steering angle.

In the above embodiment, the relative steering angle θhr is computed based on the output signal of the rotation angle sensor 23 that detects the rotation angle of the rotor of the electric motor 18. In other embodiments, however, as shown by dashed line in FIG. 1, the relative steering angle θhr may be detected based on a steering angle sensor 81 that detects a relative rotation angle of the steering shaft 6.

In the above embodiment, the straight traveling state determination condition that is used to determine whether the vehicle is in the straight traveling state or not is that all of the first to seventh conditions are satisfied. In other embodiments, however, the straight traveling state determination condition may be that all of the first to third conditions are satisfied. That is, the straight traveling state determination condition may be that the vehicle speed V is equal to or higher than the predetermined threshold A (V≥A and A>0), the absolute value |YR| of the yaw rate is equal to or smaller than the predetermined threshold B (|YR|≤B and B>0), and the absolute value of the sum of steering torque T and motor torque (assist torque) Ta calculated as the torque applied to the steering shaft from the q-axis current command value Iq* is equal to or smaller than the predetermined threshold C (|Ta+T|≤C and C>0).

In other embodiments, the vehicle speed gain setting unit 62 and the vehicle speed gain multiplication unit 63 may be omitted in FIG. 7. In this case, the compensating current value Ir that is output from the steering wheel return control unit is computed by multiplying the basic compensating current value Iro set by the basic compensating current value setting unit 61 by the steering wheel return gain Gr. In other embodiments, the vehicle speed gain setting unit 74 and the vehicle speed gain multiplication unit 75 may be omitted in FIG. 10. In this case, the compensating current value Ir is computed by multiplying the basic compensating current value Iro set by the basic compensating current value setting unit 73 by the steering wheel return gain Gr.

In the above embodiment, the electric motor 18 is a three-phase brushless motor. In other embodiments, however, the electric motor 18 may be a motor other than the three-phase brushless motor, such as a brushed DC motor.

What is claimed is:

1. An electric power steering apparatus comprising:
   an electric motor that generates a steering assist force;
   a steering torque detector that detects steering torque;
   a basic assist current value setting device that sets a basic assist current value based on the steering torque detected by the steering torque detector;
   a relative steering angle detector that detects a relative steering angle;
   a neutral position determining device that determines a steering position of a vehicle is a neutral steering position, when a predetermined straight traveling state determination condition for the vehicle has been satisfied;
   an absolute steering angle computation device that, after the neutral position determining device has determined that the steering position of the vehicle is the neutral steering position, computes an absolute steering angle with respect to the neutral steering position determined by the neutral position determining device, based on the relative steering angle that is detected by the relative steering angle detector;
   a compensating current value computation device that, after the absolute steering angle has been computed, computes a compensating current value for steering wheel return control of applying torque in such a direction that the steering wheel returns to the neutral steering position when a driver returns the steering wheel to the neutral steering position based on the absolute steering angle that is computed by the absolute steering angle computation device;
   a basic assist current value correction device that changes a correction of the basic assist current value that is set by the basic assist current value setting device, according to the determination of whether the predetermined straight traveling state determination condition for the vehicle has been satisfied, wherein the basic assist current value correction device decreases an absolute value of the basic assist current value that is set by the basic assist current value setting device, before the absolute steering angle computation device computes the absolute steering angle;
   a target current value computation device that computes the target current value based on the basic assist current value corrected by the basic assist current value correction device and the compensating current value computed by the compensating current value computation device; and
   a motor control device that controls the electric motor to drive the electric motor based on the computed target current value.

2. The electric power steering apparatus according to claim 1, wherein
   the basic assist current value correction device includes:
   a first correction gain setting device that sets a first correction gain, and
   a first multiplication device that multiplies the basic assist current value that is set by the basic assist current value setting device by the first correction gain that is set by the first correction gain setting device, and
   the first correction gain setting device:
   sets the first correction gain to a predetermined value less that is less than one before the absolute steering angle computation device has computed the absolute steering angle, and
   sets the first correction gain to one after the absolute steering angle computation device has computed the absolute steering angle.

3. The electric power steering apparatus according to claim 1, wherein
   the basic assist current value correction device includes a first correction gain setting device that sets a first correction gain, and a first multiplication device that multiplies the basic assist current value that is set by the basic assist current value setting device by the first correction gain that is set by the first correction gain setting device, and
   the first correction gain setting device sets the first correction gain to a predetermined value less than one before the absolute steering angle computation device is allowed to compute the absolute steering angle, and sets the first correction gain to one after the absolute steering angle computation device is allowed to compute the absolute steering angle.

4. The electric power steering apparatus according to claim 1, wherein
   the basic assist current value correction device includes a first correction gain setting device that sets a first correction gain, and a first multiplication device that multiplies the basic assist current value that is set by the basic assist current value setting device by the first correction gain that is set by the first correction gain setting device,
   the first correction gain setting device sets the first correction gain to a predetermined value less than one before the absolute steering angle computation device is allowed to compute the absolute steering angle, and gradually increases the first correction gain from the predetermined value to one and then fixes the first correction gain to one after the absolute steering angle computation device is allowed to compute the absolute steering angle,
   the compensating current value computation device includes:
   a basic compensating current value computation device that computes a basic compensating current value by using the absolute steering angle that is computed by the absolute steering angle computation device,
   a second correction gain setting device that sets a second correction gain, and
   a second multiplication device that multiplies the basic compensating current value that is computed by the basic compensating current value computation device by the second correction gain that is set by the second correction gain setting device, and
   the second correction gain setting device sets the second correction gain to zero before the absolute steering angle computation device is allowed to compute the absolute steering angle, and gradually increases the second correction gain from zero to one and then fixes the second correction gain to one after the absolute steering angle computation device is allowed to compute the absolute steering angle.

5. The electric power steering apparatus according to claim 1, wherein
   the basic assist current value correction device includes:
   a first correction gain setting device that sets a first correction gain, and a first multiplication device that multiplies the basic assist current value that is set by the basic assist current value setting device by the first correction gain that is set by the first correction gain setting device, the first correction gain setting device:
sets the first correction gain to a predetermined value less than one before the absolute steering angle computation device is allowed to compute the absolute steering angle, and
gradually increases the first correction gain from the predetermined value to one and then fixes the first correction gain to one after the absolute steering angle computation device is allowed to compute the absolute steering angle, the compensating current value computation device includes:
a basic compensating current value computation device that computes a basic compensating current value by using the absolute steering angle that is computed by the absolute steering angle computation device,
a second correction gain setting device that sets a second correction gain, and
a second multiplication device that multiplies the basic compensating current value that is computed by the basic compensating current value computation device by the second correction gain that is set by the second correction gain setting device, and
the second correction gain setting device:
sets the second correction gain to zero before the absolute steering angle computation device is allowed to compute the absolute steering angle,
gradually increases the second correction gain from zero to one, and
fixes the second correction gain to one after the absolute steering angle computation device has computed the absolute steering angle.

6. The electric power steering apparatus according to claim 1, wherein the relative steering angle detector includes a relative rotation angle detector that detects a relative rotation angle of the electric motor, and a relative steering angle computation device that computes the relative steering angle based on the relative rotation angle that is detected by the relative rotation angle detector.

7. The electric power steering apparatus according to claim 1, wherein the relative steering angle detector includes a relative rotation angle detector that detects a relative rotation angle of the electric motor, and a relative steering angle computation device that computes the relative steering angle based on the relative rotation angle that is detected by the relative rotation angle detector.

8. The electric power steering apparatus according to claim 2, wherein the relative steering angle detector includes a relative rotation angle detector that detects a relative rotation angle of the electric motor, and a relative steering angle computation device that computes the relative steering angle based on the relative rotation angle that is detected by the relative rotation angle detector.

9. The electric power steering apparatus according to claim 3, wherein the relative steering angle detector includes a relative rotation angle detector that detects a relative rotation angle of the electric motor, and a relative steering angle computation device that computes the relative steering angle based on the relative rotation angle that is detected by the relative rotation angle detector.

10. The electric power steering apparatus according to claim 4, wherein the relative steering angle detector includes a relative rotation angle detector that detects a relative rotation angle of the electric motor, and a relative steering angle computation device that computes the relative steering angle based on the relative rotation angle that is detected by the relative rotation angle detector.

11. The electric power steering apparatus according to claim 5, wherein the relative steering angle detector includes a relative rotation angle detector that detects a relative rotation angle of the electric motor, and a relative steering angle computation device that computes the relative steering angle based on the relative rotation angle that is detected by the relative rotation angle detector.

12. An electric power steering apparatus comprising:
an electric motor that generates a steering assist force;
a steering torque detector that detects steering torque;
a relative steering angle detector that detects a relative steering angle; and
at least one processor or circuit configured to:
set a basic assist current value based on the steering torque detected by the steering torque detector;
before an absolute steering angle has been computed, decrease an absolute value of the set basic assist current value;
when a predetermined straight traveling state determination condition for the vehicle has been satisfied, determine that a steering position of a vehicle is a neutral steering position, and compute an absolute steering angle with respect to the determined neutral steering position and based on the detected relative steering angle;
after the absolute steering angle has been computed, compute a compensating current value for steering wheel return control of applying torque in such a direction that the steering wheel returns to the neutral steering position, when a driver returns the steering wheel to the neutral steering position based on the computed absolute steering angle;
change a correction of the set basic assist current value according to the determination of whether the predetermined straight traveling state determination condition for the vehicle has been satisfied;
compute a target current value based on the corrected assist current value and the computed compensating current value; and
control the electric motor to drive based on the computed target current value.

13. An electric power steering apparatus comprising:
a basic assist current value setting device that sets a basic assist current value based on steering torque detected by a steering torque detector;
a neutral position determining device that determines a steering position of a vehicle is a neutral steering position, when a predetermined straight traveling state determination condition for the vehicle has been satisfied;
an absolute steering angle computation device that, after the neutral position determining device has determined that the steering position of the vehicle is the neutral steering position, computes an absolute steering angle with respect to the neutral steering position determined by the neutral position determining device, based on a relative steering angle that is detected by a relative steering angle detector;
a compensating current value computation device that, after the absolute steering angle has been computed, computes a compensating current value for steering wheel return control of applying torque in such a direction that the steering wheel returns to the neutral steering position when a driver returns the steering wheel to the neutral steering position based on the absolute steering angle that is computed by the absolute steering angle computation device;

a basic assist current value correction device that changes a correction of the basic assist current value that is set by the basic assist current value setting device, according to the determination of whether the predetermined straight traveling state determination condition for the vehicle has been satisfied, wherein the basic assist current value correction device decreases an absolute value of the basic assist current value that is set by the basic assist current value setting device, before the absolute steering angle computation device computes the absolute steering angle;

a target current value computation device that computes the target current value based on the basic assist current value corrected by the basic assist current value correction device and the compensating current value computed by the compensating current value computation device; and a motor control device that controls an electric motor that generates a steering assist force to drive the electric motor based on the computed target current value.

* * * * *